United States Patent
Desprez-Le Goarant et al.

(10) Patent No.: US 7,598,987 B2
(45) Date of Patent: Oct. 6, 2009

(54) FLICKER DETECTION GAIN CONTROL CIRCUIT, DIGITAL IMAGING SYSTEM, AND METHOD

(75) Inventors: Yann Denis Desprez-Le Goarant, Singapore (SG); Chee Weng Yee, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 536 days.

(21) Appl. No.: 11/290,308

(22) Filed: Nov. 29, 2005

(65) Prior Publication Data

US 2007/0126895 A1    Jun. 7, 2007

(51) Int. Cl.
  *H04N 9/73* (2006.01)
  *H04N 5/235* (2006.01)
  *H03F 3/45* (2006.01)
  *H03G 3/00* (2006.01)

(52) U.S. Cl. ............... 348/226.1; 348/228.1; 348/255; 348/229.1; 330/254; 330/278

(58) Field of Classification Search ........... 348/255, 348/226.1–229.1, 910, 470; 330/254, 278, 330/229.1; 250/214
See application file for complete search history.

(56) References Cited

U.S. PATENT DOCUMENTS

| | | | |
|---|---|---|---|
| 5,065,248 A | 11/1991 | Homma | |
| 6,295,085 B1 * | 9/2001 | Munson et al. | 348/226.1 |
| 6,519,002 B1 | 2/2003 | Tomaszewski | |
| 6,630,953 B1 * | 10/2003 | Toyoda et al. | 348/226.1 |
| 6,710,818 B1 | 3/2004 | Kasahara et al. | |
| 6,900,834 B2 | 5/2005 | Henderson et al. | |
| 7,278,577 B2 * | 10/2007 | Yahagi et al. | 235/462.28 |
| 2003/0112343 A1 | 6/2003 | Katoh et al. | |
| 2004/0080637 A1 * | 4/2004 | Nakamura et al. | 348/255 |
| 2005/0046704 A1 | 3/2005 | Kinoshita | |
| 2005/0168602 A1 * | 8/2005 | Sumi et al. | 348/294 |
| 2005/0237401 A1 * | 10/2005 | Tan et al. | 348/255 |
| 2007/0126895 A1 * | 6/2007 | Desprez-Le Goarant et al. | 348/255 |

* cited by examiner

*Primary Examiner*—Jason Chan
*Assistant Examiner*—Michael Osinski
(74) *Attorney, Agent, or Firm*—Lisa K. Jorgenson; William A. Munck (57) ABSTRACT

A gain control circuit includes a light detector for generating an amount of current based on received light and a first switch for controlling the amount of current from the light detector delivered to a node. The gain control circuit also includes a charge storage element for providing an amount of capacitance to the node and a second switch for controlling the amount of capacitance provided to the node. The gain control circuit further includes an output interface for delivering an output signal based on the amount of current and the amount of capacitance at the node. The light detector may include multiple photodiodes, and the first switch may include a pair of NMOS switching transistors coupled to at least one photodiode. Also, the charge storage element may include multiple capacitors, and the second switch may include a PMOS transistor and an NMOS transistor coupled to each capacitor.

20 Claims, 5 Drawing Sheets

FLICKER DETECTION GAIN CONTROL CIRCUIT, DIGITAL IMAGING SYSTEM, AND METHOD

TECHNICAL FIELD

This disclosure relates generally to digital imaging systems and more specifically to a flicker detection gain control circuit, digital imaging system, and method.

BACKGROUND

Digital imaging devices are currently implemented in many types of electronic devices. These electronic devices may include digital still cameras, digital video cameras, mobile camera-phones, computer web-cams, and other types of devices. Semiconductor components are commonly used to capture images and digitally process the captured images. These semiconductor components may include charge coupled devices and complementary metal-oxide semiconductors. To capture or acquire images, digital imaging devices often use a sensor array made of an arranged pattern of photodiodes. This type of sensor array is commonly known as a "pixel array."

One of the problems encountered by conventional digital imaging devices is "flicker." Artificial lighting that uses an alternating current (AC) source, such as fluorescent lighting, contains a brightness modulation component known as flicker. The frequency of flicker for artificial lighting is twice the frequency of an AC source. For example, a 50 Hz AC power system and a 60 Hz AC power system result in 100 Hz and 120 Hz flicker frequencies, respectively. Flicker arises during image capturing when an electronic device and the frequency of an AC source are not synchronized. As an example, a frame rate commonly used in the electronics industry is 30 Hz. When this frame rate is used, flicker can result from artificial lighting employing a 50 Hz AC power system.

In conventional digital imaging devices, flicker typically causes a periodic variation in the luminance of captured images. This effect is often referred to as "banding." Banding may be common, for example, in devices that capture an image in a row-by-row fashion, where all pixel elements in a sensor row are exposed simultaneously but the onset of exposure is delayed from row to row. Consequently, the banding effect appears in a captured image as horizontal strips of different luminance. This may reduce the aesthetic quality of the captured image significantly.

The following represents a more detailed discussion of the effects of flicker based on conventional pixel elements in a conventional digital imaging device. Each pixel element typically includes a photodiode and other integrated circuitry. The photodiode generates a current according to the amount of light detected, and a sum charge is stored in an integrated capacitor. The stored charge is then converted into an output voltage, where the output voltage is proportional to the amount of charge stored in the capacitor. After that, an analog-to-digital converter converts the output voltages of the pixel elements into digital values, and the digital values are processed into a digital image. In particular, the output signal of a pixel element may be derived from integrating the photodiode current through the capacitor, as shown in the following equation:

$$V = I \ast t/c \quad (1)$$

where V is the output voltage of the pixel element, I is the photodiode current, t is the integrating time or exposure timing, and C is the parasitic capacitance of the pixel element.

Figure 1A:
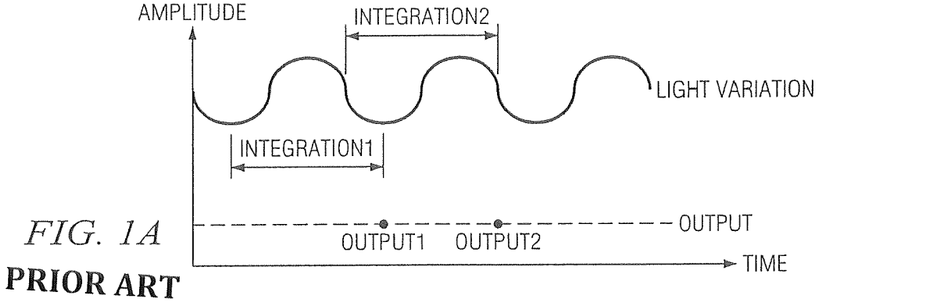
FIGS. 1A through 1C illustrate pixel exposure waveforms having different integration periods.
Figure 1B:
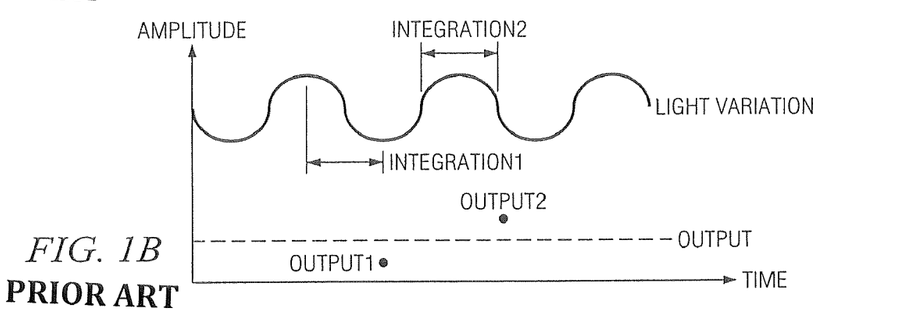

The integrating time t of a pixel element may have a wide range of values to enable a pixel array to operate in a wide range of lighting conditions. As shown in FIG. 1A, constant output signals (denoted "Output1" and "Output2") may be produced when the integrating time t corresponds to one period of the lighting frequency cycle (denoted "Light Variation"). As a result, no effects from flicker occur in this example. In contrast, FIG. 1B illustrates a difference in the output signals when the integrating time t is less than one period of the lighting frequency cycle. This difference in the output signals may cause a captured image to suffer from banding.

Several techniques have been used to try to overcome the effects of flicker. For example, in typical digital imaging devices, a user can manually set the lighting frequency or manually select the best image captured using different frequency settings. In another technique, a digital imaging device can automatically select the lighting frequency by detecting the country on which system configuration data is based. This can be achieved, for example, by integrating a wireless connection (such as a global positioning system) or a wired connection to the AC power system. However, additional circuitry and costs are introduced using this technique.

In yet another technique, a digital imaging device utilizes a digital imager with an integrated flicker detector. The flicker detector monitors the lighting frequency and adjusts the digital imaging device to the appropriate lighting frequency. The flicker detector thereby provides a mechanism for allowing the digital imaging device to adjust to current lighting conditions. As a particular example, the digital imaging device may rely on the amount of light detected and adjust the sensor array to the appropriate exposure timing, thereby reducing or eliminating any effects of flicker on captured images. This technique may overcome the inconvenience of manually setting the lighting frequency by the user, who is usually unaware of the AC power frequency in a specific country. Also, the flicker detector can be manufactured in the same semiconductor fabrication process as the digital imager, thereby reducing costs and any additional circuitry.

Figure 2:
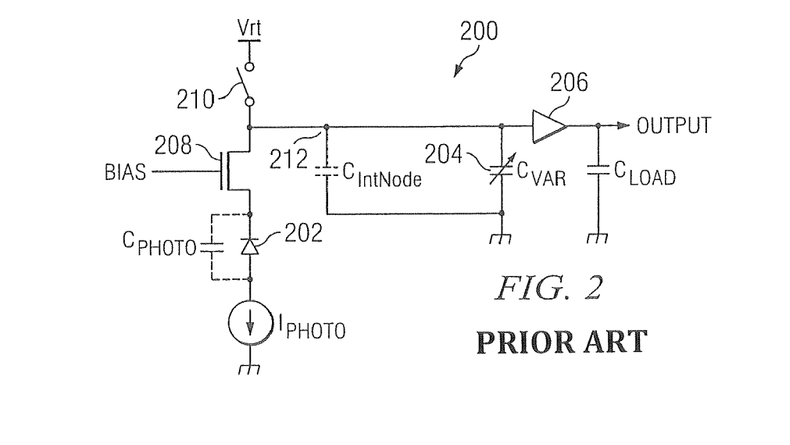
FIG. 2 illustrates a standard gain control circuit in a flicker detector.

FIG. 2 illustrates a conventional gain control circuit 200 in a flicker detector. The gain control circuit 200 includes a photodiode 202, a variable capacitance circuit 204, and a buffer 206. The photodiode 202 is coupled to an input terminal of the buffer 206 via a cascode transistor 208. A reset component 210, such as a transistor switch, is coupled to an integration node 212. The integration node 212 is disposed on an interconnection between a drain terminal of the transistor 208 and the input terminal of the buffer 206.

For a new image acquisition, the reset component 210 is closed to initialize the integration node 212 to a reset voltage (denoted $V_{rt}$). This helps to ensure that the gain control circuit 200 has the same starting voltage before the circuit 200 begins an integration. When the reset component 210 is opened, the photodiode 202 generates a current according to the amount of light detected. The transistor 208 collects the discharged photodiode current $I_{photo}$ for integration at the integration node 212. The transistor 208 also separates a large parasitic capacitance $C_{photo}$ of the photodiode 202 from the integration node 212. The buffer 206 drives an output load and separates an output load capacitance $C_{load}$ from the integration node 212. By reading the integration node 212 twice (once after reset and once after exposure to light), a voltage difference may be determined, which is directly proportional to the charge stored at the integration capacitor (represented by $C_{IntNode}$ and $C_{var}$). The voltage difference represents an output voltage $V_{out}$ of the gain control circuit 200, which may be defined by the equation:

$$V_{out} = (I_{photo} * T_{int})/(C_{IntNode} + C_{var}) \qquad (2)$$

where $T_{int}$ is the integrating time or exposure timing, and $C_{var}$ represents the only variable parameter.

Figure 1C:
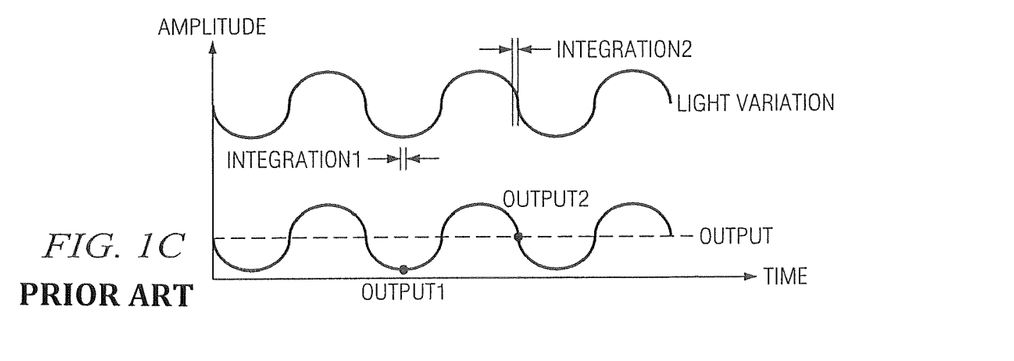

In contrast with equation (1), the time parameter $T_{int}$ in equation (2) is constant in order to detect a light variation. Applying Nyquist sampling theory, the duration of $T_{int}$ should be shorter than the flicker period to effectively sample any flicker (as shown in FIG. 1C). For example, in a 50 Hz AC power system, the value of $T_{int}$ may be fixed at 10 ms.

The maximum gain and $V_{out}$ amplitude may be obtained in the circuit 200 when $(C_{IntNode} + C_{var})$ is at a minimum level. This may require setting $C_{var}$ to zero and minimizing $C_{IntNode}$. In order to minimize $C_{IntNode}$, the reset component 210, buffer 206, and transistor 208 coupled to the integration node 212 may be designed to have the lowest possible parasitic capacitance. Also, these elements may be connected as close as possible to each other to minimize wiring capacitance. The minimum gain and $V_{out}$ amplitude may be obtained when $(C_{IntNode} + C_{var})$ is at a maximum level. This may require setting $C_{var}$ to the maximum level. The range of gain of the gain control circuit 200 may therefore be limited by the factor:

$$\text{Range} = (C_{IntNode} + \text{Max}(C_{var}))/C_{IntNode}. \qquad (3)$$

Figure 3A:
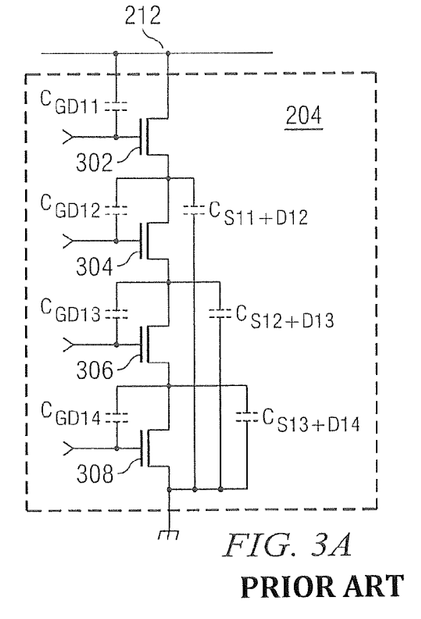
FIGS. 3A through 3C illustrate a standard variable capacitance circuit.
Figure 3B:
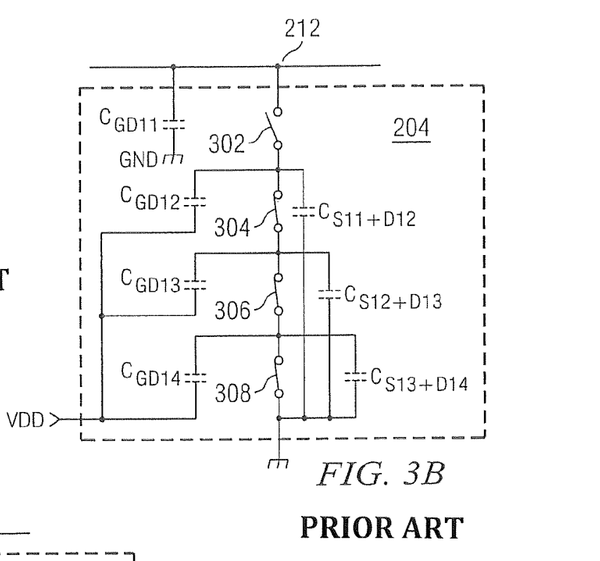

Referring to FIG. 3A, a conventional variable capacitance circuit 204 includes a plurality of Metal-Oxide Semiconductor Field Effect Transistors (MOSFETs) 302-308 with increasing gate sizes. In illustrating the operation of the variable capacitance circuit 204, suppose that when the transistor 302 is turned off, $C_{var} = C_{GD11}$ as shown in FIG. 3B. The integration capacitor is now the gate-drain capacitance of the transistor 302.

Figure 3C:
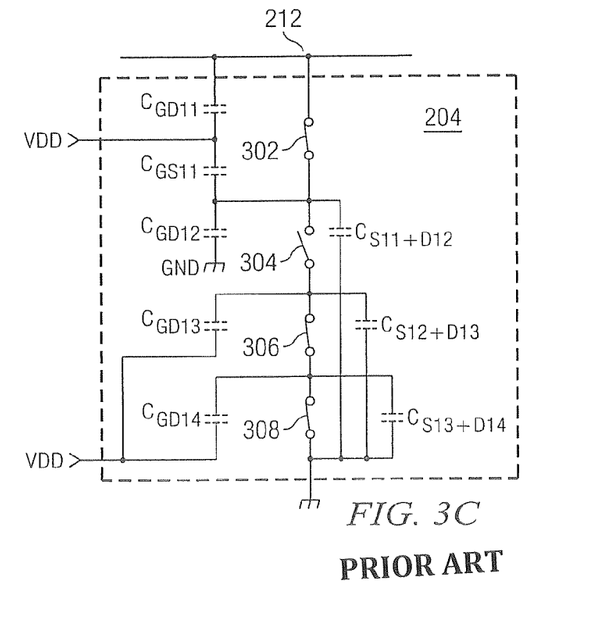

Although the conventional variable capacitance circuit 204 provides variable capacitor control for the gain control circuit 200, there are several drawbacks to this circuit 204. For example, the parasitic capacitance is being added into the integration capacitor even though the transistor 302 is turned off. Referring to FIG. 3C, when the transistor 304 is off, $C_{S11+D12}$ still contributes to the value of $C_{var}$. Another drawback is that the circuit 204 uses gate-source and/or gate-drain capacitances of the transistors 302-308 instead of gate-bulk capacitances. The gate-bulk capacitances have larger parasitic capacitances than gate-source or gate-drain capacitances but are not utilized for $C_{var}$. Hence, $C_{var}$ does not fully utilize the parasitic capacitance available in the surface area of the transistors 302-308. Yet another drawback is that noise from $V_{DD}$ and GND terminals may affect the signal-to-noise ratio of the circuit 204, and noise from the $V_{DD}$ terminal may be prominent in devices such as charge-pump devices.

In view of these problems, the conventional gain control circuit 200 has a limited range of gain (because $C_{var}$ is the only variable parameter available). Also, a larger amount of surface area in the transistors 302-308 may be required to achieve an effective range increase for the gain control circuit 200, which increases manufacturing costs. In addition, the variable capacitance circuit 204 may be sensitive to supply pollution, thus reducing the signal-to-noise ratio of the overall gain control circuit 200.

SUMMARY

This disclosure provides a flicker detection gain control circuit, digital imaging system, and method.

In a first aspect, a gain control circuit includes a light detector capable of generating an amount of current based on received light and a first switch capable of controlling the amount of current from the light detector delivered to a node. The gain control circuit also includes a charge storage element capable of providing an amount of capacitance to the node and a second switch capable of controlling the amount of capacitance provided to the node. The gain control circuit further includes an output interface capable of delivering an output signal based on the amount of current and the amount of capacitance at the node.

In particular aspects, the light detector includes a plurality of photodiodes, and the first switch includes a pair of NMOS switching transistors coupled to at least one photodiode. Also, the charge storage element includes a plurality of capacitors, and the second switch includes a PMOS transistor and an NMOS transistor coupled to each capacitor.

In a second aspect, a digital imaging system includes a sensor array capable of capturing an image under ambient light and a flicker detector capable of detecting flicker in the ambient light. The flicker detector includes a gain control circuit. The gain control circuit includes a light detector capable of generating an amount of current based on received light and a first switch capable of controlling the amount of current from the light detector delivered to a node. The gain control circuit also includes a charge storage element capable of providing an amount of capacitance to the node and a second switch capable of controlling the amount of capacitance provided to the node. The gain control circuit further includes an output interface capable of delivering an output signal based on the amount of current and the amount of capacitance at the node.

In a third aspect, a method includes generating an amount of current based on received light and controlling the amount of current delivered to a node. The method also includes providing an amount of capacitance to the node and controlling the amount of capacitance provided to the node. The method further includes delivering an output signal based on the amount of current and the amount of capacitance at the node.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 4:
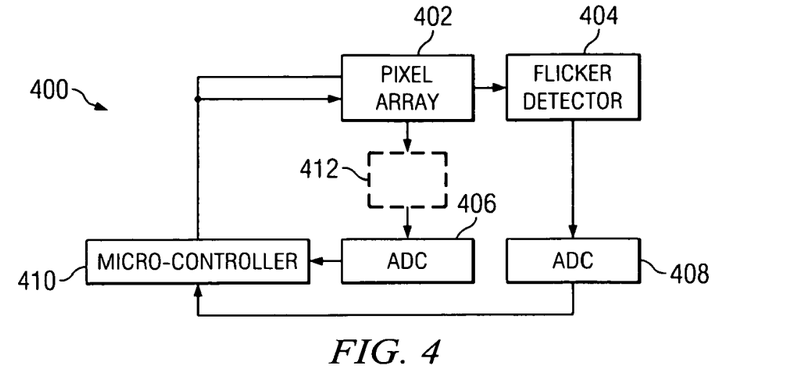
FIG. 4 illustrates a digital imaging system having a flicker detector according to one embodiment of this disclosure.

FIG. 4 illustrates a digital imaging system 400 having a flicker detector according to one embodiment of this disclosure. The embodiment of the digital imaging system 400 shown in FIG. 4 is for illustration only. Other embodiments of the digital imaging system 400 may be used without departing from the scope of this disclosure.

In this example, the digital imaging system 400 includes a pixel array 402, a flicker detector 404, two analog-to-digital converters (ADCs) 406-408, and a microcontroller 410. The digital imaging system 400 may be employed in a digital camera, digital video camera, digital camera-phone, or any other suitable device.

The pixel array 402 is capable of receiving light and generating outputs representing an image. For example, the pixel array 402 could measure the intensity of ambient lighting to generate outputs representing an image. The pixel array 402 includes any suitable structure or structures for generating outputs representing an image. As an example, the pixel array 402 could include an arranged pattern of photodiodes and other electronic circuitry.

The flicker detector 404 is capable of monitoring lighting conditions so that the digital imaging system 400 may be adjusted to an appropriate lighting frequency. For example, the flicker detector 404 may detect whether there is flicker from the ambient lighting, such as fluorescent or other artificial lighting. As a particular example, if an output signal from the flicker detector 404 includes only a direct current (DC) component, the flicker detector 404 may be detecting no flicker. If the output signal from the flicker detector 404 includes an alternating current (AC) component, the flicker detector 404 has detected some amount of flicker.

Figure 7:
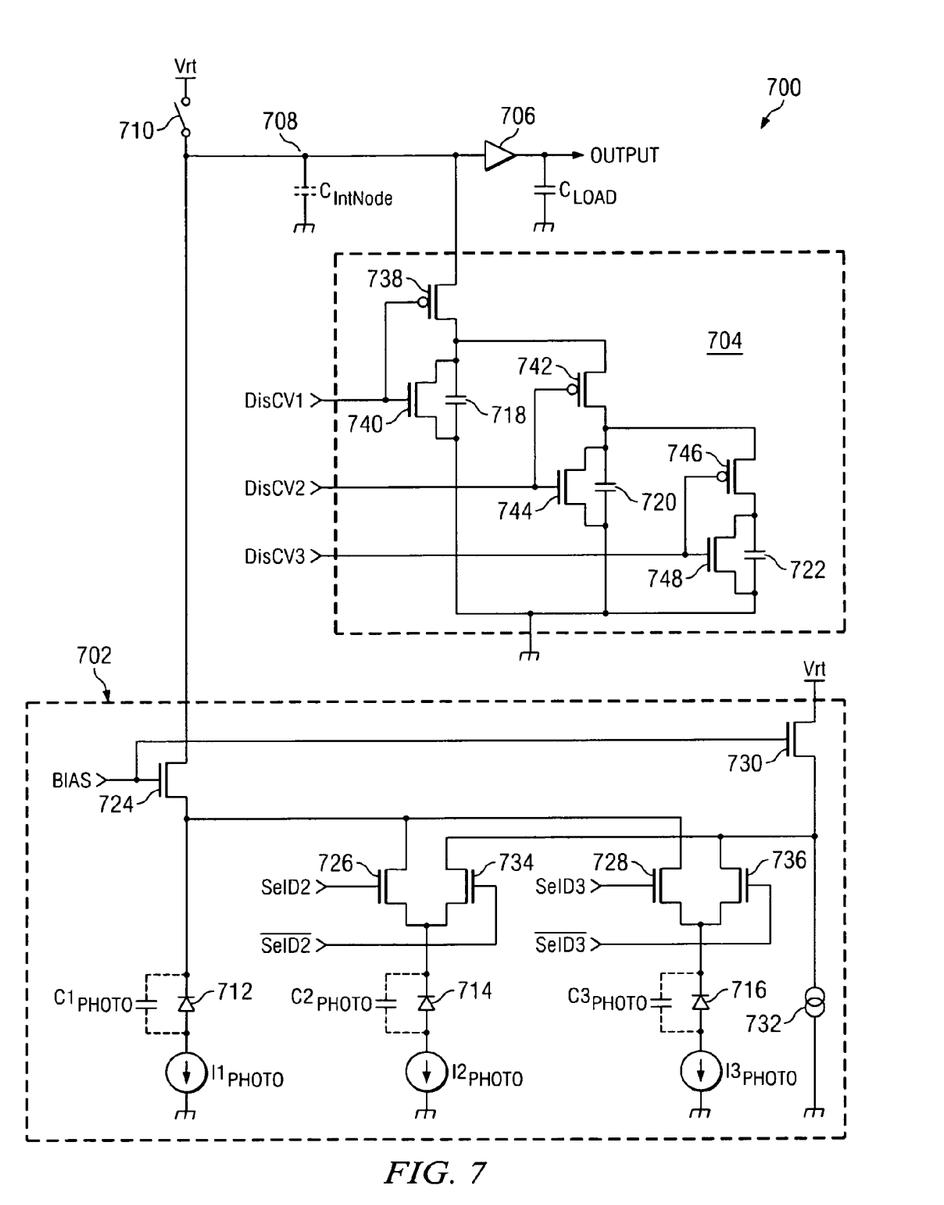
FIG. 7 illustrates a flicker detector gain control circuit according to one embodiment of this disclosure.

The flicker detector 404 includes any hardware, software, firmware, or combination thereof for monitoring lighting conditions. The flicker detector 404 could, for example, include photodiodes and other electronic circuitry. As a particular example, the flicker detector 404 could include a gain control circuit. An example gain control circuit is shown in FIG. 7, which is described below. In some embodiments, the flicker detector 404 is disposed in physical proximity to the pixel array 402, such as in the configuration shown in FIG. 5. This may allow the flicker detector 404 to be exposed to the same light incident on the pixel array 402, allowing the flicker detector 404 to accurately detect the amount of light incident on the pixel array 402.

Each of the analog-to-digital converters 406-408 is capable of receiving analog input signals and converting the analog signals into digital output signals. For example, the analog-to-digital converter 406 could convert analog signals representing a captured image into digital values, and the analog-to-digital converter 408 could convert analog signals representing the current lighting conditions into digital values. Each of the analog-to-digital converters 406-408 includes any hardware, software, firmware, or combination thereof for converting analog signals into digital signals. Although shown as separate components in FIG. 4, the analog-to-digital converters 406-408 could be combined into a single converter.

The microcontroller 410 is capable of controlling the operation of the digital imaging system 400. For example, based on data received from the analog-to-digital converters 406-408, the microcontroller 410 could generate control signals for the pixel array 402 and the flicker detector 404. This may allow, for example, the microcontroller 410 to use the output of the flicker detector 404 to determine whether to adjust the operation of the pixel array 402 to reduce or eliminate the effects of flicker. The microcontroller 410 includes any hardware, software, firmware, or combination thereof for controlling the operation of the digital imaging system 400 to reduce or eliminate the effects of flicker.

In some embodiments, the brightness of an image captured by the pixel array 402 can be controlled by the microcontroller 410, such as by adjusting the integration time or exposure timing of the pixel array 402 or by controlling an analog gain stage 412 before the analog-to-digital converter 406. For example, the pixel array 402 could operate with an exposure timing of 13 ms as the correct brightness. The flicker detector 404 detects the ambient lighting and produces an output signal. If the output signal includes only a DC component, the microcontroller 410 does not need to change the exposure timing of the pixel array 402. If the output signal includes an AC component corresponding to a 50 Hz AC power system, there is flicker, and the exposure timing or integration time $T_{int}$ of the flicker detector 404 may be significantly shorter than the flicker period to effectively sample the flicker. As a particular example, a VGA system operating at 30 frames per second may use a frame period of 33 ms and 550 lines per frame. The line period, referred to as the integration time $T_{int}$, is 33 ms/550=60 µs. Therefore, the flicker detector 404 uses $T_{int}$ with a specified value of 60 µs for either a 50 Hz or 60 Hz AC power system.

Having detected a flicker, the microcontroller 410 then adjusts the exposure timing of the pixel array 402 to, for example, 10 ms to reduce or eliminate the flicker. In some embodiments, the exposure timing of the pixel array 402 may be adjusted in multiples of the period of the lighting (such as multiples of 10 ms in a 50 Hz power system and multiples of 8.3 ms in a 60 Hz power system). By adjusting the exposure timing to 10 ms, the brightness of the captured image is reduced by a ratio of 10/13, which may make the image appear too dark. The analog gain stage 412 may be used before the analog-to-digital converter 406 to overcome this reduction in image brightness.

Figure 5:
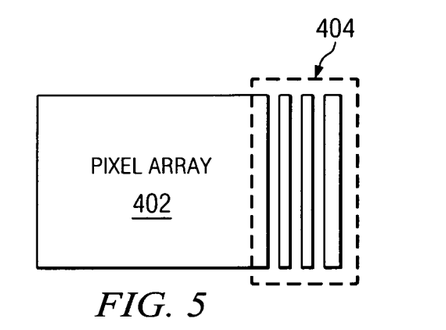
FIG. 5 illustrates flicker detector photodiodes in a pixel array according to one embodiment of this disclosure.

Although FIG. 4 illustrates one example of a digital imaging system 400 having a flicker detector, various changes may be made to FIG. 4. For example, the flicker detector 404 could be used in any suitable digital imaging system. Also, although FIG. 5 illustrates one example of flicker detector photodiodes in a pixel array, various changes may be made to FIG. 5. As an example, the photodiodes of the flicker detector 404 could be positioned in any suitable manner with respect to the pixel array 402.

Figure 6:
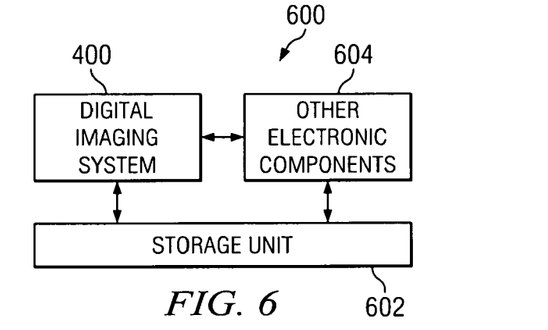
FIG. 6 illustrates an electronic device having a digital imaging system according to one embodiment of this disclosure.

FIG. 6 illustrates an electronic device 600 having a digital imaging system 400 according to one embodiment of this disclosure. The embodiment of the electronic device 600 shown in FIG. 6 is for illustration only. Other embodiments of the electronic device 600 could be used without departing from the scope of this disclosure.

In this example, the electronic device 600 includes the digital imaging system 400 of FIG. 4. The electronic device 600 also includes a storage unit 602 and other electronic components 604. The storage unit 602 is capable of storing and facilitating retrieval of digital data representing one or more captured images. The digital data representing a captured image may, for example, include the output of the analog-to-digital converter 406 of FIG. 4. The storage unit 602 includes any suitable volatile or non-volatile storage and retrieval device or devices, such as a Flash memory.

The other electronic components 604 in FIG. 6 could provide any suitable functionality depending on the electronic device 600. For example, if the device 600 represents a mobile camera-phone, the other electronic components 604 could represent circuitry for transmitting the captured images over a communication network. If the device 600 represents a digital still camera, the other electronic components 604 could represent controls used to initiate image capture, make adjusts to the digital imaging system 400, or delete captured images. The other electronic components 604 could implement any other or additional functionality.

Although FIG. 6 illustrates one example of an electronic device 600 having a digital imaging system 400, various changes may be made to FIG. 6. For example, the electronic device 600 could include any other or additional components depending on particular needs. Also, the digital imaging system 400 could be used in any other suitable device or system.

FIG. 7 illustrates a flicker detector gain control circuit 700 according to one embodiment of this disclosure. The gain control circuit 700 may, for example, be used in the flicker detector 404 in the digital imaging system 400 of FIG. 4. Among other things, the gain control circuit 700 may allow the flicker detector 400 to operate in a wider range of lighting conditions. The embodiment of the gain control circuit 700 shown in FIG. 7 is for illustration only. Other embodiments of the gain control circuit 700 could be used without departing from the scope of this disclosure.

In this example, the gain control circuit 700 includes a variable diodes gain control module 702 and a variable capacitors gain control module 704. The variable diodes gain control module 702 is coupled to an input terminal of a buffer 706. The variable capacitors gain control module 704 is coupled to an integration node 708 on an interconnection between the variable diodes gain control module 702 and the buffer 706. A reset component 710, such as a transistor switch, may selectively couple a reset voltage terminal providing a reset voltage $V_{rt}$ to the interconnection. The reset voltage $V_{rt}$ can be used to initialize the integration node 708 for a new integration cycle. The buffer 706, which acts as an output interface and drives an output load, may separate an output load capacitance $C_{load}$ from the integration node 708.

As shown in FIG. 7, the variable diodes gain control module 702 includes a plurality of photodiodes 712-716, and the variable capacitors gain control module 704 includes a plurality of capacitors 718-722. In this particular embodiment, the variable diodes gain control module 702 includes three photodiodes. When an image capture device is activated, light incident on the photodiodes 712-716 is converted into photodiode currents $I1_{photo}$, $I2_{photo}$, and $I3_{photo}$, respectively.

The photodiodes 712-716 are coupled to the buffer 706 via a cascode transistor 724, which in this example is an NMOS transistor. In particular, the transistor 724 has a source terminal coupled to the photodiodes 712-716, a drain terminal coupled to the input terminal of the buffer 706, and a gate terminal coupled to a bias voltage. For a new image acquisition, the reset component 710 is turned on, and the integration node 708 is initialized to the reset voltage $V_{rt}$. After that, the reset component 710 is turned off, and the photodiodes 712-716 discharge the capacitance of the variable capacitors gain control module 704 according to the amount of light detected by the photodiodes 712-716. During the discharging of the capacitance of the variable capacitors gain control module 704, the transistor 724 collects the generated photodiode currents ($I1_{photo}$, $I2_{photo}$, and $I3_{photo}$) for integration at the integration node 708. Also, the transistor 724 separates large parasitic capacitances ($C1_{photo}$, $C2_{photo}$, and $C3_{photo}$) of the photodiodes 712-716 from the integration node 708, helping to prevent the parasitic capacitances from influencing the integration node 708.

The photodiodes 712-716 can be selected to operate in various configurations to control the amount of photodiode current flowing to the integration node 708. In this example, the photodiodes 714-716 are coupled to the transistor 724 via NMOS transistors 726-728. The NMOS transistors 726-728 serve as switches to allow the photodiode currents $I2_{photo}$ and $I3_{photo}$ to flow through the transistor 724. As shown in FIG. 7, the cathode terminal of the photodiode 712 is coupled to the source terminal of the transistor 724, and the cathode terminals of the photodiodes 714-716 are coupled to the source terminal of the transistor 724 via the NMOS transistors 726-728, respectively. In particular, the transistor 726 has a source terminal coupled to the cathode terminal of the photodiode 714, a drain terminal coupled to the source terminal of the transistor 724, and a gate terminal coupled to a control signal SelD2. The transistor 728 has a source terminal coupled to the cathode terminal of the photodiode 716, a drain terminal coupled to the source terminal of the transistor 724, and a gate terminal coupled to another control signal SelD3. The microcontroller 410 may provide the control signals SelD2 and SelD3 to control the transistors 726-728, thereby controlling the amount of photodiode current flowing to the transistor 724. The anode terminals of the photodiodes 712-716 are coupled to ground.

When the photodiodes 714-716 are not selected for use, the photodiodes 714-716 may be coupled to a specified potential voltage level to allow fast DC restoration and prevent charge leakage. This potential voltage level can be fixed at a predetermined level by a source follower transistor 730. The source follower transistor 730 has a source terminal coupled to a current source 732, a drain terminal coupled to the reset voltage $V_{rt}$, and a gate terminal coupled to the gate terminal of the transistor 724. The photodiodes 714-716 are coupled to the transistor 730 via NMOS transistors 734-736, respectively. In particular, the transistor 734 has a source terminal coupled to the cathode terminal of the photodiode 714, a drain terminal coupled to the source terminal of the transistor 730, and a gate terminal coupled to the complement of the control signal SelD2. The transistor 736 has a source terminal coupled to the cathode terminal of the photodiode 716, a drain terminal coupled to the source terminal of the transistor 730, and a gate terminal coupled to the complement of the control signal SelD3.

Figure 8A:
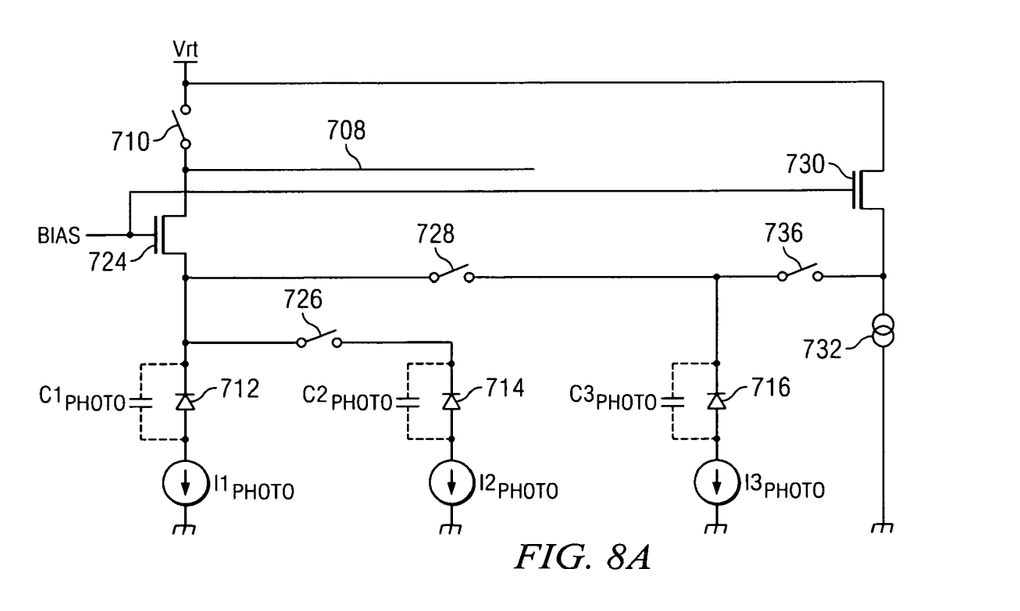
FIGS. 8A through 8C illustrate control modules in a flicker detector gain control circuit according to one embodiment of this disclosure.

The photodiodes 712-716 can be selected to operate in various configurations based on the control signals SelD2 and SelD3 and their complements. For example, when the microcontroller 410 activates the control signal SelD2 and deactivates the control signal SelD3, the transistors 726 and 736 are turned on as shown in FIG. 8A. The transistor 724 collects the photodiode currents from the photodiodes 712-714 only. Turning on the transistor 736 couples the photodiode 716 to the transistor 730, where the transistor 730 collects the charge generated by the photodiode 716. This prevents the charge generated by the photodiode 716 from leaking to neighbouring structures in the circuit 700. In particular embodiments, the photodiodes 712-716 have the same size. In other particular embodiments, the photodiodes 712-716 have different sizes to provide different amounts of photodiode current to the integration node 708.

In this particular embodiment, the variable capacitors gain control module 704 includes three capacitors. These capacitors 718-722 can be selected to operate in various configurations for the charge integration. This allows the variable capacitors gain control module 704 to control an amplitude of a voltage signal resulting from the charge integration. In this example, each of the capacitors 718-722 is coupled to a CMOS component, which serves as a switch to either activate that capacitor for use or short that capacitor to ground. As shown in FIG. 7, the capacitor 718 is coupled to a PMOS transistor 738 and an NMOS transistor 740. The transistor 738 has a source terminal coupled to the integration node 708 and a drain terminal coupled to a drain terminal of the transistor 740. A source terminal of the transistor 740 is coupled to ground. A control signal DisCV1 is commonly coupled to the gate terminals of the transistors 738-740. The capacitor 718 is coupled between the drain and source terminals of the transistor 740.

The capacitor 720 is coupled to a PMOS transistor 742 and an NMOS transistor 744. The transistor 742 has a source terminal coupled to the drain terminal of the transistor 738 and a drain terminal coupled to a drain terminal of the transistor 744. A source terminal of the transistor 744 is coupled to ground. Another control signal DisCV2 is commonly coupled to the gate terminals of the transistor 742-744. The capacitor 720 is coupled between the drain and source terminals of the transistor 744.

The capacitor 722 is coupled to a PMOS transistor 746 and an NMOS transistor 748. The transistor 746 has a source terminal coupled to the drain terminal of the transistor 742 and a drain terminal coupled to a drain terminal of the transistor 748. A source terminal of the transistor 748 is coupled to ground. A control signal DisCV3 is commonly coupled to the gate terminals of the transistors 746-748. The capacitor 722 is coupled between the drain and source terminals of the transistor 748.

Figure 8B:
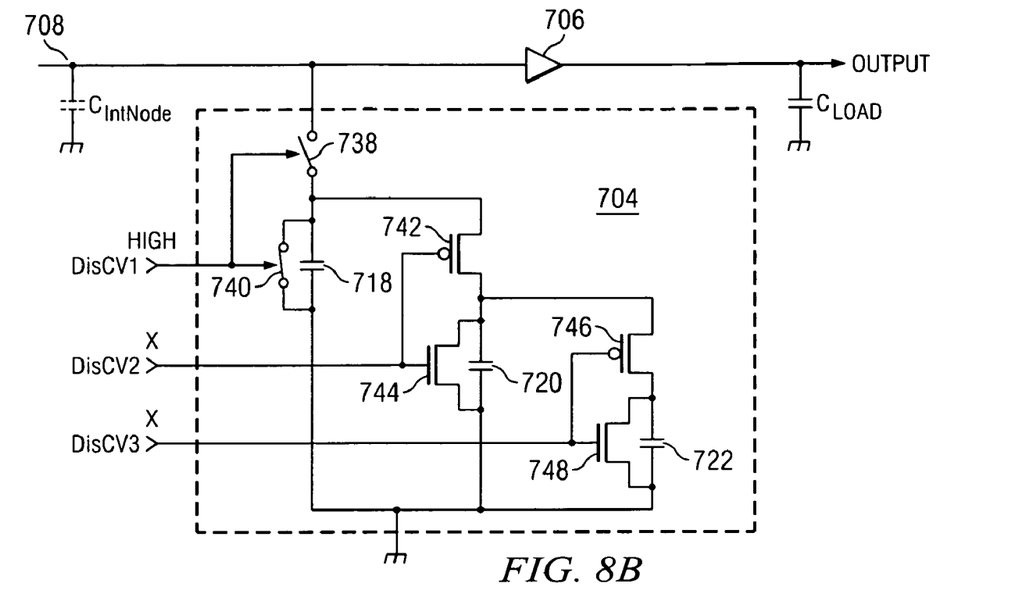

The variable capacitors gain control module 704 may operate as follows. As shown in FIG. 8B, the microcontroller 410 may send the control signals DisCV1, DisCV2, and DisCV3 to the variable capacitors gain control module 704. When the control signal DisCV1 is high, the transistor 738 is turned off. The transistor 738 acts as an open circuit that isolates the capacitor 718 and the transistor 742 from the integration node 708. The DisCV1 control signal also turns on the transistor 740, thereby shorting the capacitors 718-722 and transistors 742-748 to ground. In this configuration, only the integration node capacitance ($C_{IntNode}$) functions as the integration capacitor.

Figure 8C:
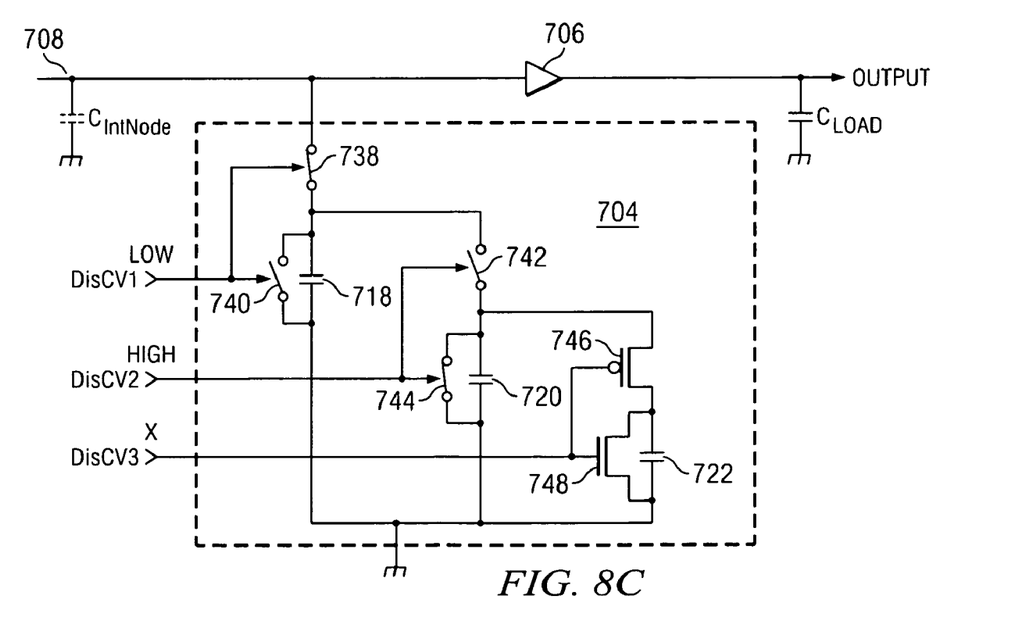

FIG. 8C illustrates another configuration of the variable capacitors gain control module 704, where the integration node capacitance ($C_{IntNode}$) and the capacitor 718 contribute to the integration capacitance. The microcontroller 410 may send a low control signal DisCV1 to turn on the transistor 738, where the transistor 738 acts as a closed circuit that couples the capacitor 718 to the integration node 708. The low DisCV1 control signal also turns off the transistor 740 to allow the capacitor 718 to operate. In addition, the microcontroller 410 sends a high control signal DisCV2 to turn off the transistor 742, which acts as an open circuit to isolate the capacitor 720 and the transistor 746 from the integration node 708. The high DisCV2 control signal also turns on the transistor 744, thereby shorting the capacitors 720-722 and the transistors 746-748 to ground.

The variable diodes gain control module 702 can be combined with the variable capacitors gain control module 704 to control the overall gain of the gain control circuit 700. This enables the microcontroller 410 to control the overall gain, and it increases the efficiency of detecting the flickering of an ambient light. In particular, the variable diodes gain control module 702 may provide fine step adjustment of the overall gain control, and the variable capacitors gain control module 704 may provide coarse step adjustment of the overall gain control. The buffer 706 delivers an output voltage based on the amount of photodiode current (one or more of $I1_{photo}$, $I2_{photo}$, and $I3_{photo}$) and the amount of capacitance (from one or more of the capacitors 718-722) at the integration node 708. The output voltage $V_{out}$ of the flicker detector 404 could be represented as:

$$V_{out} = (I_{photo} * T_{int})/(C_{IntNode} + C_{var}) \quad (4)$$

where $I_{photo}$ and $C_{var}$ are variable parameters. Also, the range of gain may be defined as:

$$\text{Range} = [(C_{IntNode} + \text{Max}(C_{var}))/C_{IntNode}] * [\text{Max}(I_{photo})/\text{Min}(I_{photo})] \quad (5)$$

Depending on the implementation, the gain control circuit 700 may have one or several advantages over conventional circuits. The variable diodes gain control module 702 may provide improved range control. The use of passive capacitors 718-722 in the variable capacitors gain control module 704 may allow better surface utilization than parasitic capacitances of transistors. The parasitic capacitance of the integration node 708 may be minimized because only one node of the PMOS transistor 738 is connected to node 708. Referring the capacitors 718-722 to ground when not selected for integration may reduce or eliminate the sensitivity of the circuit 700 to supply pollution. The combination of the gain control modules 702-704 may provide regular gain steps for the gain control circuit 700. The wide range of light levels provided by the gain control circuit 700 may address many or all indoor conditions, which is where flicker detection and processing typically improve image quality.

Although FIGS. 7 and 8A through 8C illustrate one example of a flicker detector gain control circuit 700, various changes may be made to FIGS. 7 and 8A through 8C. For example, the gain control circuit 700 could include any suitable number of photodiodes 712-716 and any suitable number of capacitors 718-722.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The terms "controller" and "microcontroller" mean any device, system, or part thereof that controls at least one operation. A controller or microcontroller may be implemented in hardware, firmware, software, or some combination of at least two of the same. The functionality associated with any particular controller or microcontroller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A gain control circuit, comprising:
   a light detector capable of generating an amount of current based on received light, the light detector comprising a plurality of photodiodes;
   a first switch comprises a plurality of transistors capable of controlling the amount of current from the light detector delivered to a node;

a collector comprising a cascode transistor coupled to the light detector via the first switch capable of collecting the amount of current;

a source follower coupled to the light detector via the first switch, the source follower capable of maintaining the light detector at a specified voltage level;

a charge storage element capable of providing an amount of capacitance to the node;

a second switch capable of controlling the amount of capacitance provided to the node; and an output interface capable of delivering an output signal based on the amount of current and the amount of capacitance at the node.

2. The gain control circuit of claim 1, wherein the plurality of transistors comprises a pair of NMOS switching transistors coupled to each of at least one of the photodiodes.

3. The gain control circuit of claim 1, wherein the source follower comprises a source follower transistor and a current source.

4. The gain control circuit of claim 1, wherein:
the charge storage element comprises a plurality of capacitors; and
the second switch comprises a plurality of transistors coupled to each of the capacitors.

5. The gain control circuit of claim 4, wherein each of the capacitors is coupled to a PMOS transistor and an NMOS transistor, the capacitor coupled between drain and source terminals of the NMOS transistor.

6. The gain control circuit of claim 1, further comprising a reset switch capable of coupling a reset voltage terminal to the node to reset a voltage level at the node.

7. The gain control circuit of claim 1, wherein the output interface comprises a buffer.

8. A digital imaging system, comprising:
a sensor array capable of capturing an image under ambient light; and
a flicker detector capable of detecting flicker in the ambient light, the flicker detector comprising a gain control circuit, the gain control circuit comprising:
a light detector capable of generating an amount of current based on received light, the light detector comprising a plurality of photodiodes;
a first switch capable of controlling the amount of current from the light detector delivered to a node, wherein the first switch comprises a plurality of transistors;
a charge storage element capable of providing an amount of capacitance to the node;
a second switch capable of controlling the amount of capacitance provided to the node; and
an output interface capable of delivering an output signal based on the amount of current and the amount of capacitance at the node, wherein the gain control circuit further comprises a collector coupled to the light detector via the first switch, the collector capable of collecting the amount of current from the light detector and delivering the amount of current to the node, and wherein the collector comprises a cascode transistor.

9. The digital imaging system of claim 8, further comprising:
at least one analog-to-digital converter capable of converting output signals of the sensor array and the flicker detector into digital signals; and
a microcontroller capable of controlling the sensor array and the flicker detector based on the digital signals.

10. The digital imaging system of claim 8, wherein the gain control circuit further comprises a source follower coupled to the light detector via the first switch, the source follower capable of maintaining the light detector at a specified voltage level.

11. The digital imaging system of claim 10, wherein:
the source follower comprises a source follower transistor and a current source.

12. The digital imaging system of claim 8, wherein:
the charge storage element comprises a plurality of capacitors; and
the second switch comprises a plurality of transistors coupled to each of the capacitors.

13. The digital imaging system of claim 8, further comprising a storage unit capable of storing the digital data.

14. The digital imaging system of claim 8, wherein the digital imaging system forms at least a portion of one of: a digital still camera, a digital video camera, a mobile cameraphone, and a computer web-cam.

15. A method, comprising:
using a plurality of photodiodes to generate an amount of current based on received light;
controlling the amount of current delivered to a node using a plurality of first transistors, the first transistors coupling at least some of the photodiodes to a cascode transistor, the cascode transistor coupled to the node;
providing an amount of capacitance to the node;
controlling the amount of capacitance provided to the node; and
delivering an output signal based on the amount of current and the amount of capacitance at the node.

16. The method of claim 15, wherein:
providing the amount of capacitance comprises using a plurality of capacitors; and
controlling the amount of capacitance comprises using a plurality of second transistors, a pair of second transistors coupled to each of the capacitors.

17. The method of claim 15, further storing the output signal in a storage unit.

18. The method of claim 15, wherein the output signal forms at least part of a digital still camera.

19. The method of claim 15, further comprising buffering the output signal.

20. The method of claim 15, wherein the output signal forms at least part of a digital video camera.

* * * * *

UNITED STATES PATENT AND TRADEMARK OFFICE
CERTIFICATE OF CORRECTION

PATENT NO. : 7,598,987 B2
APPLICATION NO. : 11/290308
DATED : October 6, 2009
INVENTOR(S) : Yann Denis Desprez-Le Goarant and Chee Weng Yee It is certified that error appears in the above-identified patent and that said Letters Patent is hereby corrected as shown below:

Column 8, line 46, after "turned on", delete "as shown in FIG. 8A".

Column 9, line 34, delete "capacitors 718-722" and insert -- capacitor 718 --.

Column 9, line 51, after "shorting", delete "the capacitors 720-722 and".

Signed and Sealed this

Twelfth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,598,987 B2  Page 1 of 1
APPLICATION NO. : 11/290308
DATED : October 6, 2009
INVENTOR(S) : Desprez-Le Goarant et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 847 days.

Signed and Sealed this

Fourteenth Day of December, 2010

David J. Kappos
*Director of the United States Patent and Trademark Office*